(12) United States Patent
Wang et al.

(10) Patent No.: US 12,698,225 B2
(45) Date of Patent: Aug. 4, 2026

(54) POROUS BIOCHAR FOR IMPROVING SEVERE POLLUTION AND PREPARATION METHOD THEREFOR

(71) Applicant: CHINESE RESEARCH ACADEMY OF ENVIRONMENTAL SCIENCES, Beijing (CN)

(72) Inventors: Lei Wang, Beijing (CN); Beidou Xi, Beijing (CN); Honghu Zeng, Beijing (CN); Nan Xu, Beijing (CN); Yan Shao, Beijing (CN); Shaofeng Li, Beijing (CN); Ming Chang, Beijing (CN); Jinsheng Wang, Beijing (CN); Xiaoshu Wang, Beijing (CN); Yangyang Wang, Beijing (CN); Gen Zhang, Beijing (CN); Lulu Pan, Beijing (CN); Jing Wang, Beijing (CN)

(73) Assignee: CHINESE RESEARCH ACADEMY OF ENVIRONMENTAL SCIENCES, Beijing (CN)

( * ) Notice: Subject to any disclaimer, the term of this patent is extended or adjusted under 35 U.S.C. 154(b) by 398 days.

(21) Appl. No.: 18/549,905

(22) PCT Filed: Feb. 23, 2022

(86) PCT No.: PCT/CN2022/077394
§ 371 (c)(1),
(2) Date: Sep. 9, 2023

(87) PCT Pub. No.: WO2022/199308
PCT Pub. Date: Sep. 29, 2022

(65) Prior Publication Data
US 2024/0140843 A1 May 2, 2024

(30) Foreign Application Priority Data
Mar. 26, 2021 (CN) .......................... 202110328479.1

(51) Int. Cl.
| | |
|---|---|
| *C02F 3/32* | (2023.01) |
| *B01J 20/12* | (2006.01) |
| *B01J 20/14* | (2006.01) |
| *B01J 20/16* | (2006.01) |
| *B01J 20/20* | (2006.01) |
| *B09B 3/40* | (2022.01) |
| *B09B 3/60* | (2022.01) |
| *C02F 1/28* | (2023.01) |
| *C02F 3/10* | (2023.01) |
| *C02F 3/34* | (2023.01) |
| *C02F 101/20* | (2006.01) |

(52) U.S. Cl.
CPC ................. *C02F 3/32* (2013.01); *B01J 20/12* (2013.01); *B01J 20/14* (2013.01); *B01J 20/16* (2013.01); *B09B 3/40* (2022.01); *B09B 3/60* (2022.01); *C02F 1/283* (2013.01); *C02F 3/106* (2013.01); *B01J 20/20* (2013.01); *C02F 3/327*

(2013.01); *C02F 3/34* (2013.01); *C02F 2101/20* (2013.01); *Y02W 10/37* (2015.05)

(58) Field of Classification Search
CPC .. C02F 3/32; C02F 1/283; C02F 3/106; C02F 3/327; C02F 3/34; C02F 2101/20; B01J 20/12; B01J 20/14; B01J 20/16; B01J 20/20; B09B 3/40; B09B 3/60; Y02W 10/37
USPC .................................. 210/602, 912, 913, 914
See application file for complete search history.

(56) References Cited

U.S. PATENT DOCUMENTS

| | | | | |
|---|---|---|---|---|
| 2017/0210677 A1 * | 7/2017 | Bontchev | ............... | C09K 17/04 |
| 2020/0261847 A1 * | 8/2020 | Wan | ........................ | B01D 53/44 |

FOREIGN PATENT DOCUMENTS

| | | | | | |
|---|---|---|---|---|---|
| CN | 106734181 A | * | 5/2017 | ............... | B09C 1/10 |
| CN | 107282630 A | * | 10/2017 | ............... | B09C 1/10 |
| CN | 107500983 A | * | 12/2017 | ............... | C05G 3/80 |
| CN | 109794501 A | * | 5/2019 | | |
| CN | 110871213 A | * | 3/2020 | ............... | B09C 1/08 |
| CN | 110982735 A | * | 4/2020 | ............. | C12N 1/205 |
| CN | 112391375 A | * | 2/2021 | ............. | C12N 11/14 |

OTHER PUBLICATIONS

Machine-generated English translation of CN 110982735, generated on Nov. 20, 2025.*
Machine-generated English translation of CN 112391375, generated on Nov. 20, 2025.*

(Continued)

*Primary Examiner* — Fred Prince

(74) *Attorney, Agent, or Firm* — CBM PATENT CONSULTING, LLC

(57) ABSTRACT

A porous biochar for improving heavy pollution and a method for producing the same. Said porous biochar is prepared as follows: arrowhead, which has excellent enrichment of lead, is used to absorb heavy metal lead in polluted water or artificial wetlands, simultaneously absorb heavy metal cadmium, thereafter is dried and treated as a biomass, and then the biomass is calcined in stages with a passivating agent in a high temperature environment, so as to heavy metals such as lead and cadmium be stably coated or enriched in a biochar, which is mixed with *Pseudomonas aeruginosa* having high resistant, to obtain the porous biochar; the porous biochar has high specific surface area, high porosity and excellent mechanical properties, is very stable under different acid-base environments and oxidizing conditions.

10 Claims, No Drawings

(56)     References Cited

OTHER PUBLICATIONS

Machine-generated English translation of CN 109794501, generated on Nov. 20, 2025.*
Machine-generated English translation of CN 107500983, generated on Nov. 20, 2025.*
Machine-generated English translation of CN 110871213, generated on Nov. 20, 2025.*
Machine-generated English translation of CN 107282630, generated on Nov. 20, 2025.*
Machine-generated English translation of CN 106734181, generated on Nov. 20, 2025.*

* cited by examiner

POROUS BIOCHAR FOR IMPROVING SEVERE POLLUTION AND PREPARATION METHOD THEREFOR

TECHNICAL FIELD

The present invention belongs to the field of environmental manufacturing technology and specifically relates to a porous biochar for improving heavy metal pollution and a method of making the same.

BACKGROUND ART

Since the 1950s, with a large increase in population, rapid development of industries such as mining, smelting and manufacturing, extensive use of agrochemicals and discharge of municipal sewage soils, resulting in rapid and excessive accumulation of biologically toxic metallic elements such as lead, cadmium, mercury, copper and the like in the environment, environmental pollution problems caused by human activity has attracted widespread attention.

Sewage problems, in particular caused by heavy metals pollution, directly impact human health and therefore also are imperative. Disposal of sewage poorly pollutes ground water sources, especially cadmium and lead therein, since cadmium is readily absorbed by crops and enriched in humans via the food chain, while lead has become the most area polluted metal element due to its widespread use.

Currently, phytoremediation technology in soil heavy metal remediation technology is easy to operate and has a wide range of applications. After repairing the polluted site, the plants enriched with heavy metals can be harvested mechanically, and heavy metals are removed thoroughly from the polluted site. However, enrichment of large amounts of heavy metals in plants from polluted sites, while reducing the environmental risk of soil, results in large amounts of polluted biomass. There are studies that have shown that these heavy metals cannot be degraded by vegetation or biomass and, once released back into the environment, cause secondary pollution to soil and groundwater.

Therefore, how to stably enrich or collect heavy metal elements is challenge now facing.

SUMMARY OF THE INVENTION

In order to overcome the above problems, the present inventors have conducted research, and provides a porous biochar for improving heavy metal pollution and a method for producing the same. Arrowhead has excellent enrichment of lead, and is used to absorb heavy metal lead in polluted water or artificial wetlands, simultaneously absorb heavy metal cadmium, thereafter is dried and treated as a biomass, and then the biomass is calcined in stages with a passivating agent in a high temperature environment, so as to heavy metals such as lead and cadmium be stably coated or enriched in biochar, which is mixed with *Pseudomonas aeruginosa* having high resistant, to obtain the porous biochar. The porous biochar according to the invention has high specific surface area, high porosity and excellent mechanical properties, is very stable under different acid-base environments and oxidizing conditions. Said method takes advantage of the passivating agents, such as diatomaceous earth, zeolite and attapulgite, effectively extending the migration time of heavy metals lead and cadmium and reducing the potential hazard of lead and cadmium to the environment, thereby completing the present invention.

In particular, it is an object of the present invention to provide the following aspects:

In a first aspect, there is provided a production method of a biochar for improving heavy metal pollution and the method comprises:

step 1, preparing the biochar;

step 2, mixing the biochar prepared in step 1 with microorganisms.

In second aspect, there is provided porous biochar produced according to method of first aspect for improving heavy metal pollution.

Beneficial effects of the present invention include:

(1) The porous biochar for improving heavy metal pollution provided according to the present invention, has a large specific surface area, high porosity, excellent mechanical properties and is very stable under different acid-base environments and oxidizing conditions.

(2) The production method of porous biochar for improving heavy metal pollution provided according to the present invention, wherein an arrowhead, which has excellent enrichment of lead, and is used to absorb heavy metal lead in polluted water or artificial wetlands, simultaneously absorb heavy metal cadmium, and the biomass is calcined in stages with the passivating agents in high temperature environments, so as to heavy metals such as lead and cadmium be steadily coated or enriched in the biochar, thereby prolonging the migration time of heavy metals lead and cadmium.

(3) The production method of porous biochar for improving heavy metal pollution provided according to the present invention, wherein, *Pseudomonas aeruginosa* having high resistant is acclimated and can grow normally in environments containing heavy metal such as lead and cadmium, reducing lead and cadmium or achieving low activity conversion, effectively reducing the dissolution rate of lead and cadmium.

DETAILED DESCRIPTION OF INVENTION

The present invention will be described in more detail through embodiments. Through these descriptions, the features and advantages of the present invention will become clearer.

The term "exemplary" as used herein is intended to be "serving as an example, an illustrative embodiment, or an embodiment". Any of the embodiment(s) described herein as "exemplary" need not be construed as preferred as or better than other embodiment(s).

An aspect of the invention aimed at providing a method for producing a biochar for improving heavy metal pollution, and the method comprises:

Step 1, producing a biochar.

According to a preferred embodiment, said step 1 comprises:

Step 1-1, planting a plant in water or artificial wetland polluted by heavy metals;

Step 1-2, harvesting the plant planted or grown in step 1-1 to prepare a biomass;

Step 1-3, calcining the biomass prepared in step 1-2 with a passivating agent.

in particular:

In step 1-1, the plant is an aquatic plant, preferably an emergent plant, such as arrowhead, pampas grass, reed, umbrella sedge, etc., more preferably arrowhead.

According to the invention, said emergent plants have developed ventilated tissues and developed underground rhizomes or tubers, which are developmentally sound, conducting, mechanical and protective tissues, have developed ventilated tissues, favoring enrichment of heavy metals.

In the present invention, arrowhead has a high reproductive coefficient, is excellent for enriching with lead, and in addition, can also enrich with heavy metal cadmium in water or artificial wetlands.

According to the invention, a concentration of lead element below 500 mg/L and that of cadmium element below 200 mg/L in the polluted water or artificial wetland generally may guarantee the normal growth of the arrowhead.

In the present invention, with increasing concentration of heavy metal elements Pb, Cd, arrowhead is strengthened by a poison, and the content of soluble proteins in the arrowhead system is trending down. Too high a heavy metal concentration may lead to complete inactivation of proteins in the arrowhead roots and leaves, namely death of the arrowhead. To ensure growth of the arrowhead and efficient enrichment of the heavy metals Pb, Cd, it is preferred that the concentration of the lead element is 200-400 mg/L and the concentration of the cadmium element is 50-150 mg/L, more preferably the concentration of the lead element is 300 mg/L and the concentration of the cadmium element is 90 mg/L.

According to the present invention, the growth cycle is not lower than 90 days, in order to effectively enrich the heavy metal elements Pb and Cd in the plant. preferably the growth cycle is 100 to 150 days, more preferably 110 to 130 days, such as 120 days.

In step 1-1, in order to meet plant's need for nutritional elements during growth, urea fertilization is preferably used, which may be in amount of 10 to 30 kg/m², preferably 15 to 20 kg/m², such as 18 kg/m².

In step 1-2, preparation of biomass comprises drying and comminuting or pulverization.

Wherein, the drying temperature is 50 to 120° C., preferably 70 to 100° C., more preferably 80 to 90° C., for example 85° C.; and the drying time is 1 to 5 h, preferably 2 to 4 h, more preferably 2.5 to 3 h, for example 3 h.

According to the invention, if no comminution treatment is applied to the plant, it is disfavoring mixing of the biomass with the passivating agent(s) or passivator(s), and it is hardly to coat or enrich heavy metal elements in the porous biochar, which is disfavoring the stability of the porous biochar.

Further, the particle size is 5 to 30 mm, preferably 10 to 20 mm, more preferably 12 to 15 mm, such as 13 mm.

In steps 1-3, said passivating agent comprises any one or more of diatomaceous earth, zeolite, and attapulgite, preferably diatomaceous earth, zeolite, and attapulgite are used in a mixture.

According to the present invention, the diatomaceous earth contains a large number of micropores, cavities and channels, which are low in weight, large in specific surface area and low in thermal conductivity and have a long lasting effect on the solidification of heavy metals.

According to the present invention, the zeolite is a natural zeolite with strong selection and adsorption capacity, large adsorption capacity and ion exchange capacity, which significantly reduces the migration rate and the content of exchanged states of heavy metals lead and cadmium, promoting low activity conversion of exchanged states to carbonate bound states, organic states, residual states, and the like.

According to the present invention, said attapulgite is an aqueous layer chain-like magnesic silicate mineral, having a large specific surface area and strong adsorption properties.

Furthermore, the attapulgite is inexpensive and easily available, playing an important role in the in situ passivation repair of heavy metals.

In the present invention, since a large amount of impurities such as illite, carbonate, etc. is contained in the attapulgite, the presence of the impurities influences the use performance of the attapulgite. The present inventors have found that activating the attapulgite at 200 to 600° C. increases the specific surface area of the attapulgite and increases the pore channels of the attapulgite.

According to the invention, the activation temperature is preferably from 300 to 500° C., more preferably from 400 to 450° C.; the activation time is 1 to 3 h, preferably 1.5 to 2.5 h, more preferably 2 h.

In the present invention, the attapulgite is activated at a too high temperature or for a too long time, resulting in loss of structural water from the attapulgite or removal of hydroxyl groups resulting in collapse of the channels and packing of fiber bundles resulting in a reduced specific surface area.

According to preferred embodiment, dry weight ratio of biomass, diatomaceous earth, zeolite to attapulgite is 1:(0.1-0.6):(0.2-0.8):(0.2-0.7), preferably 1:(0.2-0.4):(0.3-0.5):(0.3-0.6), more preferably 1:0.3:0.4:0.35.

According to the invention, different passivating agents are selected and formulated to differ in the passivating effect on heavy metals Pb and Cd, and the stability of the porous biochar produced is optimal when the weight ratio of biomass, diatomaceous earth, zeolite to attapulgite is 1:(0.1-0.6):(0.2-0.8):(0.2-0.7), especially 1:0.3:0.4:0.35.

In the present invention, in order to stably coat or enrich more heavy metals Pb, Cd in porous biochar, biomass, diatomaceous earth, zeolite and attapulgite are preferably mixed by wet blending and then calcined.

Specifically, wet blending comprises: the biomass is formulated into a suspension having water content of 30-50%, and diatomaceous earth is formulated into a liquid having water content of 40-60%, and then the biomass having water content of 30-50% and the diatomaceous earth having water content of 40-60% are mixed, and stirred for 2-8 h. After mixing well, attapulgite is added to the mixed system, stirred for 5-12 h, and finally zeolite is added, stirred for 3-18 h, and then is dried at 50-150° C. for 2-6 h, thereafter is milled.

Further, the biomass is formulated into a suspension having water content of 40-45%, diatomaceous earth is formulated into a liquid having water content of 45-50%, and the biomass having water content of 40-45% is mixed with the diatomaceous earth having water content of 45-50%, and thereafter the mixture is stirred for 4-6 h. After mixing well, attapulgite is added to the mixed system, stirred for 7-10 h, and finally zeolite is added, stirred for 8-12 h, and then is dried at 80-110° C. for 3-5 h, and thereafter is milled.

Still further, the biomass is formulated into a suspension having water content of 42%, diatomaceous earth is formulated into a liquid having water content of 46%, and then the biomass having water content of 42% is mixed with the diatomaceous earth having water content of 46%, and thereafter the mixture is stirred for 5 h. After mixing well, attapulgite is added to the mixed system, stirred for 8 h, and finally zeolite is added, stirred for 10 h, and then is dried at 90° C. for 4 h, and thereafter is milled.

According to the present invention, prior to blending, the passivating agent is pulverized or crushed to a suitable size to facilitate increased contact area between the biomass and the passivating agent during blending.

In the present invention, the diatomaceous earth has a particle size of 1 to 10 mm, preferably 2 to 6 mm, more preferably 3 to 5 mm; the zeolite has a particle size is 0.1 to 6 mm, preferably 1 to 4 mm, more preferably 1 to 2 mm; the particle size of attapulgite is 0.5 to 8 mm, preferably 2 to 5 mm, more preferably 2.5 to 3 mm.

The inventors found that the disposal of biomass by calcination may be effective to avoid secondary pollution of the environment. After biomass pyrolysis, the recyclable or centrally treated porous biochar is enriched in heavy metals, avoiding the release of heavy metals, wherein the passivators such as diatomaceous earth, zeolite and attapulgite remove impurities and moisture in the pores, enrich or coat more heavy metals in the porous biochar and have a greater ability to inhibit the release of heavy metals in the high temperature environment of calcination.

Calcination in stages in the present invention allows increasing the pore size of the biochar, increasing the mechanical properties of the biochar, effectively extending the migration time of the heavy metals and reducing the dissolution of the heavy metals. And more importantly, the biochar resulting from staged calcination has a higher capacity to accept and donate electrons.

According to a preferred embodiment, the calcination comprises:

First stage: the pyrolysis temperature is 180-300° C., the holding time is 2-6 h, and the heating rate is 4-8° C./min;

Second stage: the pyrolysis temperature is 300-600° C., the holding time is 0.5-4 h, and the heating rate is 6-10° C./min.

In a further preferred embodiment, the calcination comprises:

First stage: the pyrolysis temperature is 210-260° C., the holding time 3-5 h, and the heating rate is 5-7° C./min;

Second stage: the pyrolysis temperature is 400-550° C., the holding time is 2-3 h, and the heating rate is 7-9° C./min.

In an even further preferred embodiment, the calcination comprises:

First stage: the pyrolysis temperature is 230° C., the holding time is 3.5 h, and the heating rate is 6° C./min;

Second stage: the pyrolysis temperature is 500° C., the holding time is 2.5 h, and the heating rate is 8° C./min.

According to the invention, the calcined biochar is passed through a 500-800 meshes, such as a screen with 600 meshes.

Step 2, mixing the biochar produced in step 1 with microorganisms.

According to a preferred embodiment, said step 2 comprises:

Step 2-1, acclimating the microorganism;

Step 2-2, mixing the biochar produced in step 1 with the microorganisms acclimated in step 2-1.

Step 2 is detailed described below.

In step 2-1, calcined biochar can act as electron acceptor for microbial extracellular respiration and growth and as electron donor to promote reduction of heavy metal ions due to its higher capacity to accept and donate electrons.

According to the invention, the microorganism is a high resistant bacterium, preferably *Pseudomonas aeruginosa*.

Further, due to the high amount of heavy metals lead and cadmium enriched in biochar, in order to reduce the intoxication mortality of *P. aeruginosa*, *P. aeruginosa* is preferably acclimated, i.e. stressful growth in media containing heavy metal such as lead and cadmium, achieving hardiness growth of *P. aeruginosa* species in heavy metal such as lead and cadmium environment, increasing tolerance to lead and cadmium.

According to the invention, the acclimation step is a pre-expansion of *P. aeruginosa* species into $10^8$-$10^9$/mL liquid species, followed by inoculation in a medium containing heavy metals.

According to the invention, said *Pseudomonas aeruginosa* species are commercially available.

According to the invention, the concentration of element Pb in the liquid medium is 0.5-1.5 mg/L, preferably 0.8-1.2 mg/L, more preferably 1.0 mg/L, and the concentration of element Cd is 0.1-1.0 mg/L, preferably 0.3-0.6 mg/L, more preferably 0.5 mg/L.

In the present invention, the culture medium is a liquid culture medium containing nutrients described for growth of *Pseudomonas aeruginosa* species.

In preferred embodiment, said medium composition comprises 10 g/L of peptone, 5 g/L of sodium chloride, 5 g/L of beef extract, and the pH of medium is adjusted with hydrochloric acid and a solution of sodium hydroxide.

According to the invention, the culture medium has a pH of 6.0 to 11.0, preferably 7.0 to 9.0, more preferably 8.0 to 8.5, for example 8.5. $H_3O^+$ competes with heavy metal cations for adsorption sites, the contact of heavy metal ions with the adsorption sites is hindered, which results in slow growth rate of *P. aeruginosa*. As the pH of the reaction system increases, the cell surface functional groups of *P. aeruginosa* ionize and the number of surface negative charges increases, with strong binding capacity to heavy metal cations and faster growth rate.

According to the invention, the cultivation temperature is maintained at the temperature at which the microorganism normally grows, between 2° and 40° C., preferably between 25 and 30° C., more preferably at 28° C.

In accordance with the present invention, the cultivation time is 36-96 h, preferably 48-72 h, more preferably 60 h in order to obtain well-standing microorganisms.

Further, after incubation, well-established species are transferred to another medium containing heavy metals such as lead and cadmium, and after 24-48 h incubation, *P. aeruginosa* is placed into bacterial fluid with a concentration of $10^{10}$-$10^{12}$/mL to obtain final desired microorganism.

In step 2-2, the mixing ratio of biochar to microorganisms is: based on 20 parts by weight of biochar, 5-20 parts by volume, preferably 8-15, more preferably 10, of microorganisms is mixed with, wherein 1 part by volume is 1 cm³ when 1 part by weight is 1 g.

Another aspect of the present invention aims to provide porous biochar for improving heavy metal pollution produced by the method as described above.

EXAMPLES

The invention is further described below by way of specific examples, which are, however, merely illustrative and do not constitute any limitation on the scope of protection of the invention.

Example 1

(1) A pool is rinsed with fresh water, and sands having a particle size of less than 3 mm and non-contaminating soils are then laid into the pool at a thickness of 20 cm. The pool is filled with water to 30 cm deep, and 12 arrowheads are planted in the soil of the pool. After one week, a solution of lead nitrate with the concentration of lead element of 300 mg/L and a solution of cadmium chloride with the concentration of cadmium element of 90 mg/L are added to the pool. The arrowheads are fertilized with urea (available from Jinan Xinyuchengtai Chemtech Co. Ltd.) at 30 days, 60 days and 90 days of growth with the amount of 40 g/m² one time. On 120 days of growth, the arrowheads are collected and dried at 85° C. for 3 h before crushing to 13 mm to give the biomass.

(2) The attapulgite is crushed to 3 mm and activated at 400° C. for 2 h until use.

(3) The biomass, diatomaceous earth, natural zeolite to attapulgite in a weight ratio (on a dry basis) of 1:0.3:0.4:0.35 are subjected to the following:

The biomass prepared in step (1) is formulated into a suspension with a water content of 42%, diatomaceous earth having a particle size of 4 mm is formulated into a liquid having a water content of 46%, and then the biomass having water content of 42% is mixed with the diatomaceous earth having water content of 46%, and thereafter the mixture is stirred for 5 h. After mixing well, the attapulgite of step (2) is added to the mixed system, stirred for 8 h, and finally natural zeolite having particle size of 2 mm is added, dried at 90° C. for 4 h after stirring for 10 h. After milling into powder and passing through a sieve of 600 meshes, calcining according to the following procedure to produce the biochar:

First stage: the pyrolysis temperature is 230° C., the holding time is 3.5 h, and the heating rate is 6° C./min;

Second stage: the pyrolysis temperature is 500° C., the holding time is 2.5 h, and the heating rate is 8° C./min.

(4) 10 g/L of peptone, 5 g/L of sodium chloride, and 5 g/L of beef cream are weighed as the medium, and the pH of the medium is adjusted to 8.5 with hydrochloric acid and a solution of sodium hydroxide to give beef cream-peptone broth;

*Pseudomonas aeruginosa* species (available from Shanghai Yiyan Biotech Co., Ltd.) is inoculated in the beef cream-peptone broth for 12 h at 30° C., and 1 mL of bacterial suspension is inoculated in another beef cream-peptone broth and expanded to 10⁹/mL *P. aeruginosa* species.

A solution of lead nitrate with the lead element concentration of 1.0 mg/L and a solution of cadmium chloride with the cadmium elemental concentration of 0.5 mg/L are added to the beef cream-peptone broth described above, and 1 mL of bacterial fluid of *Pseudomonas aeruginosa* is inoculated in this medium and cultured at 28° C. for 60 h, from which well-established species are transferred to another beef cream-peptone broth containing 1.0 mg/L $Pb^{2+}$ and 0.5 mg/L $Cd^{2+}$ and incubated at ambient temperature for 48 h to produce *P. aeruginosa* broth, that is formulated to produce *P. aeruginosa* at a concentration of 10¹²/mL.

(5) 2 g of the biochar produced in step (3) with 1 cm³ of *P. aeruginosa* fluid produced in step (4) are mixed to give the porous biochar for improving heavy metal pollution.

EXPERIMENTAL EXAMPLES

Experimental Example 1

Reference "Microwave Digestion Method for Total Soil Heavy Metals (HJ832-2017)", 0.200 g of the porous biochar prepared in the Example is accurately weighed and placed in a polytetrafluoroethylene digestion tank, 9 mL of concentrated nitric acid and 3 mL of concentrated HCl are added, allowed to react upon standing for 12 h, and then are put into a microwave digester for digestion, to obtain a digestion liquor. After digestion Is completed, the digestion liquor is transferred to a 100 mL volumetric flask, brought to volume up to the mark, shaken well and then passed through a 0.45 μm water-based filtration membrane. The contents of the heavy metal elements Pb and Cd are determined by ICP-OES, converted to the content of heavy metals in the porous biochar solids, i.e.: total enrichment of 76 mg/g for $Pb^{2+}$ and total enrichment of 21 mg/g for $Cd^{2+}$.

Experimental Example 2

Reference Environmental Protection Standard "Solid Waste Leaching Toxic Leaching Method (HJ 557-2009)", 0.2 g of the porous biochar from Example 1 is weighed and placed in a 250 mL Erlenmeyer flask, 100 mL of deionized water is added. The bottle is closed with parafilm, and the Erlenmeyer flask is placed in a thermostat shaking box and shaken at 25° C. for 8 h with a frequency of 110/min. After completion of the shaking, leaving to stand for 16 h, the supernatant is taken out and brought to volume to 100 mL, and then passed through a 0.45 μm water-based filtration membrane. The contents of Pb and Cd elements in the filtrate are determined by ICP-OES, and the results are shown in Table 1:

TABLE 1

| | Content and dissolution rate of heavy metals in porous biochar | | | |
| --- | --- | --- | --- | --- |
| | $Pb^{2+}$ | | $Cd^{2+}$ | |
| Sample | Dissolution Concentration (mg/g) | Dissolution Rate (%) | Dissolution Concentration (mg/g) | Dissolution Rate (%) |
| Example 1 | 0.615 | 0.81 | 0.152 | 0.72 |

Experimental Example 3

0.200 g of the porous biochar of Example 1 is weighed and placed in a 250 mL Erlenmeyer flask, and 100 mL each of a solution having a pH of 6.0, 8.0, or 10.0 (adjusted with HCl and NaOH) is added respectively. The Erlenmeyer flask is placed in a thermostat shaking box and shaken at 25° C. for 8 h with a frequency of 200/min. After the shaking is completed, leaving to stand for 16 h, the supernatant is taken out and brought to volume to 100 mL, and then passed through a 0.45 μm water-based filtration membrane. The contents of Pb and Cd elements in the filtrate are determined by ICP-OES, and the results are shown in Table 2:

TABLE 2

| | Content and dissolution rate of heavy metals in porous biochar | | | |
| --- | --- | --- | --- | --- |
| | $Pb^{2+}$ | | $Cd^{2+}$ | |
| pH | Dissolution Concentration (mg/g) | Dissolution Rate (%) | Dissolution Concentration (mg/g) | Dissolution Rate (%) |
| 6.0 | 0.676 | 0.89 | 0.199 | 0.95 |
| 8.0 | 0.654 | 0.86 | 0.170 | 0.81 |
| 10.0 | 0.623 | 0.82 | 0.157 | 0.75 |

Experimental Example 4

0.200 g of the porous biochar of Example 1 is weighed and placed in a 250 mL Erlenmeyer flask, and 100 mL each of a solution of hydrogen peroxide with mass concentration of 5%, 10% or 15% is added respectively. The Erlenmeyer flask is placed in a thermostat shaking box and shaken at 25° C. for 8 h with a frequency of 200/min. After completion of the shaking, leaving to stand for 16 h, the supernatant is taken out and brought to a volume of 100 mL, and then passed through a 0.45 μm water-based filtration membrane. The contents of Pb and Cd elements in the filtrate are determined by ICP-OES, and the results are shown in Table 3:

TABLE 3

| Content and dissolution rate of heavy metals in porous biochar | | | | |
| --- | --- | --- | --- | --- |
| | $Pb^{2+}$ | | $Cd^{2+}$ | |
| Hydrogen Peroxide (%) | Dissolution Concentration (mg/g) | Dissolution Rate (%) | Dissolution Concentration (mg/g) | Dissolution Rate (%) |
| 5 | 0.653 | 0.86 | 0.170 | 0.81 |
| 10 | 0.699 | 0.92 | 0.178 | 0.85 |
| 15 | 0.745 | 0.98 | 0.189 | 0.90 |

The present invention has been described in detail with reference to preferred embodiments and illustrative examples, but these specific embodiments are only illustrative explanations of the invention, should not be construed as limiting the present invention. Various improvements, substitutions or modifications may be made to the technical disclosure and its embodiments without departing from the spirit and scope of protection of the present invention, all falling within the scope of protection of the invention as set forth in the appended claims.

What is claimed is:

1. A production method of a porous biochar for improving heavy metal pollution, wherein the method comprises:
   step 1, producing a biochar:
      step 1-1, planting a plant in water or artificial wetland polluted by heavy metals;
      step 1-2, harvesting the plant grown in step 1-1 to prepare a biomass;
      step 1-3, calcining the biomass prepared in step 1-2 with a passivating agent to obtain the biochar;
   step 2, mixing the biochar with microorganism;
      step 2-1, acclimating the microorganism;
      step 2-2, mixing the biochar with the microorganism acclimated in step 2-1 to obtain the porous biochar;
   wherein the microorganism is *Pseudomonas aeruginosa*; the porous biochar has a dissolution rate of lead from 0.81% to 0.98% and a dissolution rate of cadmium from 0.72% to 0.95%.

2. The method according to claim 1, characterized in that, in step 1-1, the plant is an aquatic plant;
   said heavy metals include the lead and the cadmium, wherein, a concentration of the lead is lower than 500 mg/L and a concentration of the cadmium is lower than 200 mg/L.

3. The method according to claim 2, wherein the aquatic plant is an emergent plant.

4. The method according to claim 3, wherein the emergent plant is selected from the group consisting of arrowhead, pampas grass, reed and umbrella sedge.

5. The method according to claim 4, wherein the emergent plant is the arrowhead.

6. The method according to claim 1, characterized in that, in step 1-2, the plant grown in step 1-1 is harvested, dried, and pulverized, to prepare the biomass.

7. The method according to claim 1, wherein said passivating agent is one or more selected from the group consisting of diatomaceous earth, zeolite, and attapulgite.

8. The method according to claim 7, wherein said passivating agent is a mixture of the diatomaceous earth, the zeolite, and the attapulgite.

9. The method according to claim 1, characterized in that, in steps 1-3, said calcining comprises:
   first stage: pyrolysis temperature is 180-300° C., for 2-6 h, and heating rate is 4-8° C./min;
   second stage: the pyrolysis temperature is 300-600° C., for 0.5-4 h, and the heating rate is 6-10° C./min.

10. The method according to claim 1, characterized in that, said acclimating comprises: pre-expansion culturing *Pseudomonas aeruginosa* species into $10^8$-$10^9$/mL liquid species, and then inoculating and culturing in a medium containing heavy metals including the lead and the cadmium.

* * * * *